(12) United States Patent
Kato et al.

(10) Patent No.: US 8,976,558 B2
(45) Date of Patent: Mar. 10, 2015

(54) POWER SUPPLY DEVICE WITH SMOOTHING CAPACITOR AND FALLING VOLTAGE CHOPPER CIRCUIT

(75) Inventors: Go Kato, Yokosuka (JP); Takuro Hiramatsu, Yokosuka (JP); Kenji Sakai, Yokosuka (JP); Chikako Katano, Yokosuka (JP); Hiroshi Takenaga, Yokosuka (JP); Tomoaki Shimizu, Yokosuka (JP)

(73) Assignee: Toshiba Lighting & Technology Corporation, Kanagawa (JP)

( * ) Notice: Subject to any disclaimer, the term of this patent is extended or adjusted under 35 U.S.C. 154(b) by 427 days.

(21) Appl. No.: 13/422,418

(22) Filed: Mar. 16, 2012

(65) Prior Publication Data

US 2013/0010509 A1    Jan. 10, 2013

(30) Foreign Application Priority Data

Jul. 8, 2011    (JP) .................................. 2011-151975

(51) Int. Cl.
*H02M 7/217*    (2006.01)
*H05B 33/08*    (2006.01)

(52) U.S. Cl.
CPC ......... *H05B 33/0815* (2013.01); *H02M 7/2176* (2013.01)
USPC .......................................................... 363/89

(58) Field of Classification Search
CPC .......... G05F 1/46; H02M 3/156; H02M 7/217
USPC ..................................... 323/282, 351; 363/89
See application file for complete search history.

(56) References Cited

U.S. PATENT DOCUMENTS

| 3,733,540 | A | * | 5/1973 | Hawkins | .......................... 363/89 |
| 4,792,887 | A | * | 12/1988 | Bernitz et al. | .................. 363/89 |
| 4,821,166 | A | * | 4/1989 | Albach | ............................ 363/89 |

(Continued)

FOREIGN PATENT DOCUMENTS

| CN | 1954483 | 4/2007 |
| EP | 1 868 285 | 12/2007 |

(Continued)

OTHER PUBLICATIONS

Chinese Office Action issued in CN 201210077795.7 on Mar. 5, 2014.

(Continued)

*Primary Examiner* — Jeffrey Sterrett
(74) *Attorney, Agent, or Firm* — DLA Piper LLP (US)

(57) ABSTRACT

According to one embodiment, a power supply device includes a rectifying circuit configured to rectify an alternating-current power supply, a first capacitor configured to smooth a voltage after rectification, and a falling voltage chopper circuit configured to supply electric power to a load. The first capacitor is set to a capacity in which a section where a voltage after smoothing drops to an output voltage to the load is provided in a rectified half period of the alternating-current power supply. The falling voltage chopper circuit includes at least one switching element configured to receive an input of the voltage after smoothing, operate in a section where the voltage after smoothing exceeds the output voltage, and pause in a section of the output voltage and a second capacitor provided on an output side and having a capacity larger than the capacity of the first capacitor.

2 Claims, 2 Drawing Sheets

(56) References Cited

U.S. PATENT DOCUMENTS

| | | | |
|---|---|---|---|
| 5,612,609 A * | 3/1997 | Choi | 323/210 |
| 5,818,707 A * | 10/1998 | Seong et al. | 363/89 |
| 6,128,205 A * | 10/2000 | Bernd et al. | 363/89 |
| 7,239,120 B2 * | 7/2007 | Adragna et al. | 323/285 |
| 8,040,114 B2 * | 10/2011 | Saint-Pierre | 323/222 |
| 8,040,703 B2 * | 10/2011 | Melanson | 363/89 |
| 8,207,713 B2 * | 6/2012 | Sugawara | 323/222 |
| 8,270,190 B2 * | 9/2012 | Adragna | 363/89 |
| 8,351,232 B2 * | 1/2013 | Zhang | 363/89 |
| 2009/0200870 A1 | 8/2009 | Uno | |
| 2010/0188007 A1 | 7/2010 | Deppe | |
| 2013/0010509 A1 * | 1/2013 | Kato et al. | 363/126 |
| 2013/0235623 A1 * | 9/2013 | Huang | 363/21.17 |

FOREIGN PATENT DOCUMENTS

| | | |
|---|---|---|
| JP | 2010-157548 | 7/2010 |
| JP | 2011-501351 | 1/2011 |
| WO | WO 2009/001279 | 12/2008 |

OTHER PUBLICATIONS

English Language Translation of Chinese Office Action issued in CN 201210077795.7 on Mar. 5, 2014.
English Language Abstract and Translation of JP 2010-157548 published Jul. 15, 2010.
English Language Abstract of CN 1954483.
European Office Action issued in EP 21056805 on Apr. 4, 2014.
English Language Abstract of JP 2011-501351 published Jan. 6, 2011.
English Language Translation of JP 2011-501351 published Jan. 6, 2011.
European Search Report issued in EP 12160119.9 on Oct. 23, 2012.
English Language Abstract of JP 2010-157548 published Jul. 15, 20100.
English Language Translation of JP 2010-157548 published Jul. 15, 20100.

* cited by examiner

US 8,976,558 B2

POWER SUPPLY DEVICE WITH SMOOTHING CAPACITOR AND FALLING VOLTAGE CHOPPER CIRCUIT

INCORPORATION BY REFERENCE

The present invention claims priority under 35 U.S.C. §119 to Japanese Patent Application No. 2011-151975 filed on Jul. 8, 2011. The content of the application is incorporated herein by reference in their entirety.

FIELD

Embodiments described herein relate generally to a power supply device that drives a load.

BACKGROUND

In the past, a power supply device that drives an LED element as a load converts an alternating-current voltage of an alternating-current power supply into a direct-current voltage and outputs the direct-current voltage to between both ends of the LED element to light the LED element.

In such a power supply device that drives the LED element as the load, there is a demand for improvement of a power factor for the purpose of reducing a power capacity (VA). A power supply device adopting, for example, a power supply circuit of a flyback type is proposed in order to obtain a high power factor. However, components of the power supply device are increased in size.

Therefore, the power supply device in the past is increase in size to obtain a high power factor.

There is a demand for a power supply device that is small in size and can obtain a high power factor.

DESCRIPTION OF THE DRAWINGS

FIGS. 3(a) and 3(b) are waveform charts of an electric current after smoothing by the first capacitor, wherein FIG. 3(a) is a waveform chart of a comparative example and FIG. 3(b) is a waveform chart of the embodiment;

FIGS. 5(a) and 5(b) are waveform charts of surge absorption by the first capacitor, wherein FIG. 5(a) is a waveform chart of an input voltage of an alternating-current power supply and FIG. 5(b) is a waveform chart of a voltage after smoothing by the first capacitor.

DETAILED DESCRIPTION

In general, according to an embodiment, a power supply device includes a rectifying circuit configured to rectify an alternating-current power supply, a first capacitor configured to smooth a voltage after rectification, and a falling voltage chopper circuit configured to supply electric power to a load. The first capacitor, is set to a capacity in which a section where a voltage after smoothing drops to an output voltage to the load is provided in a rectified half period of the alternating-current power supply. The falling voltage chopper circuit includes at least one switching element configured to receive an input of the voltage after smoothing, operate in a section where the voltage after smoothing exceeds the output voltage, and pause in a section of the output voltage and a second capacitor provided on an output side and having a capacity larger than the capacity of the first capacitor.

With the power supply device according to this embodiment, the capacity of the first capacitor is set to the capacity in which the section where the voltage after smoothing drops to the output voltage to the load is provided in the rectified half period of the alternating-current power supply. The switching element of the falling voltage chopper circuit operates in the section where the voltage after smoothing exceeds the output voltage and pauses in the section of the output voltage. Therefore, it is possible to provide a power supply device that is small in size and can obtain a high power factor.

An embodiment is explained with reference to FIG. 1 to FIGS. 5(a) and 5(b).

Figure 1:
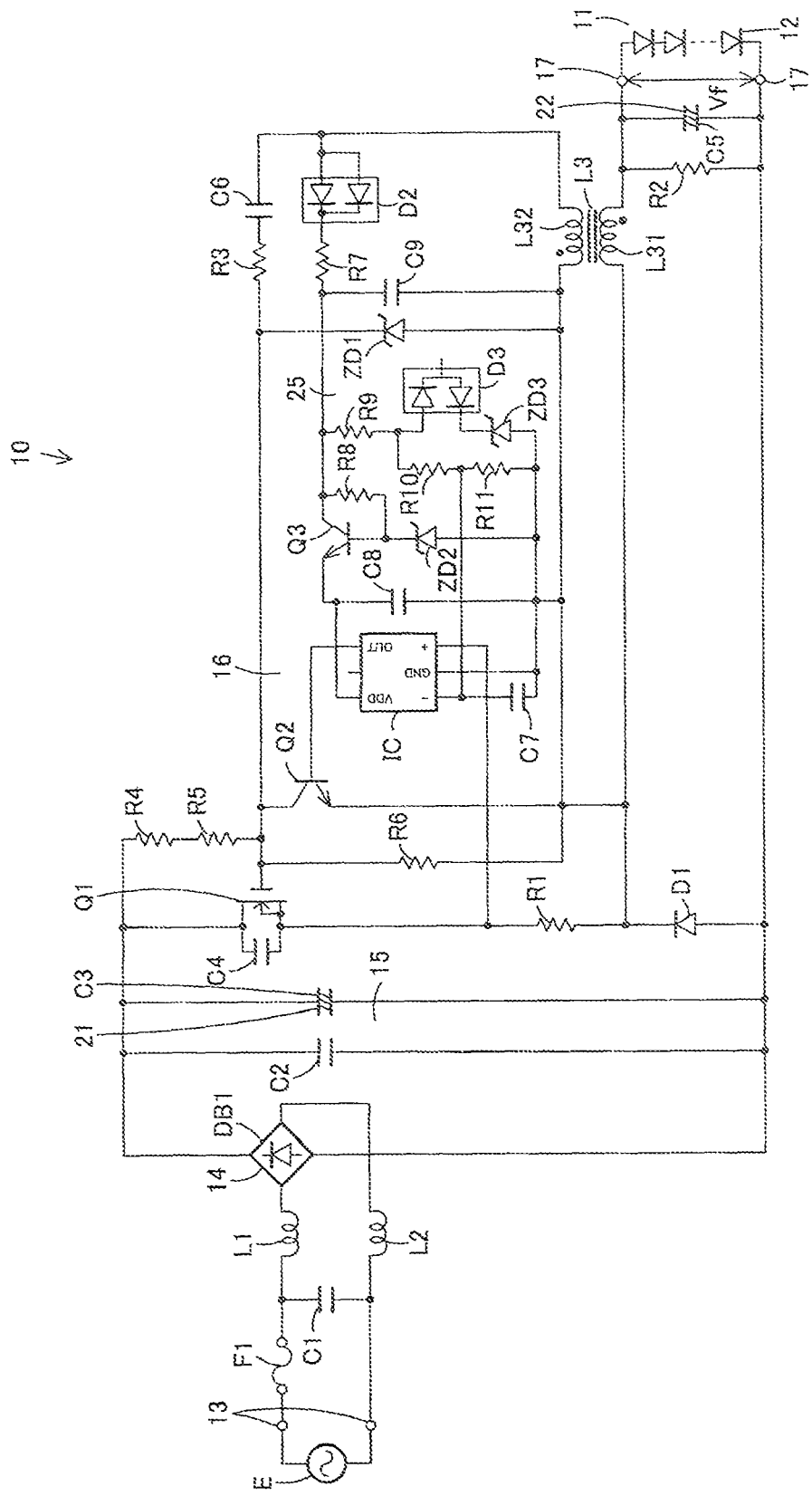
FIG. 1 is a circuit diagram of a power supply device according to an embodiment.

In FIG. 1, a power supply device 10 lights plural LED elements 12 connected in series as a load 11. The power supply device 10 includes an input section 13 to which a commercial alternating-current power supply E is connected, a rectifying circuit 14 that rectifies an alternating-current voltage of the commercial alternating-current power supply E, a smoothing circuit 15 that smoothes the rectified alternating-current voltage, a falling voltage chopper circuit 16 that steps down a voltage after smoothing, and an output section 17 that is connected to the load 11 and outputs an output voltage Vf from the falling voltage chopper circuit 16.

A capacitor C1 and inductors L1 and L2, which form a noise filter circuit, are connected to both ends of the input section 13 via a fuse F1.

A full-wave rectifier DB1 is used as the rectifying circuit 14. An input end of the full-wave rectifier DB1 is connected to the inductors L1 and L2.

The smoothing circuit 15 includes a first capacitor 21 connected to an output end of the full-wave rectifier DB1 in parallel to a capacitor C2 for noise prevention. The first capacitor 21 includes an electrolytic capacitor C3 set to a predetermined capacity.

In the falling voltage chopper circuit 16, the load 11 is connected to both ends of the electrolytic capacitor C3 via a parallel circuit of a field effect transistor Q1, which is a MOSFET functioning as a switching element, and a capacitor C4, a resistor R1, a first inductor section L31 of an inductor L3, and the output section 17. A resistor R2 and a second capacitor 22 are connected to the output section 17 in parallel. The second capacitor 22 includes an electrolytic capacitor C5 set to a predetermined capacity larger than the capacity of the first capacitor 21 in a relation with the capacity of the first capacitor 21.

A cathode of a diode D1 is connected between the resistor R1 and the inductor L3. An anode of the diode D1 is connected to the load 11 and a negative pole side of the capacitor C5. The diode D1 has action of discharging energy stored in the inductor L3 via the load 11 and the electrolytic capacitor C5 when the field effect transistor Q1 is off.

One end of a second inductor section L32 magnetically coupled to the first inductor section L31 of the inductor L3 is connected to a gate of the field effect transistor Q1 via a capacitor C6 and a resistor R3. The other end of the second inductor section L32 is connected between the resistor R1 and the first inductor section L31.

Resistors R4 and R5 are connected between a drain and the gate of the field effect transistor Q1. A resistor R6 is connected between the gate of the field effect transistor Q1 and a source of the field effect transistor Q1 connected via the resistor R1.

A Zener diode ZD1, a cathode of which is connected to the gate of the field effect transistor Q1, is connected in parallel to the resistor R6. A collector and an emitter of an NPN-type transistor Q2, the collector of which is connected to the gate of the field effect transistor Q1, are connected to the resistor R6.

A control section IC is connected to a base of the transistor Q2. A section between the source of the field effect transistor Q1 and the resistor R1 is connected to a plus terminal of the control section IC. The control section IC detects, via the resistor R1, a voltage flowing to the field effect transistor Q1, compares the voltage with a reference value, and turns on or off the transistor Q2 according to a result of the comparison.

A power supply circuit 25 that supplies power to the control section IC is connected between the one end and the other end of the second inductor section L32. In the power supply circuit 25, the one end of the second inductor section L32 is connected to a VDD terminal of the control section IC via a diode D2, a resistor R7, and an emitter and a collector of an NPN-type transistor Q3. The other end of the second inductor section L32 is connected to a minus terminal of the control section IC via a capacitor C7. A cathode of a Zener diode ZD2 is connected to a base of the transistor Q3. A capacitor C8 is connected between the emitter of the transistor Q3 and an anode of the Zener diode ZD2. A resistor R8 is connected between the collector and the base of the transistor Q3. A resistor R9, a diode D3, and a Zener diode ZD3 are connected between a section between the resistor R7 and the resistor R8 and the minus terminal of the control section IC connected via the capacitor C7. Resistors R10 and R11 are connected in parallel to the diode D3 and the Zener diode ZD3. A section between the resistors R10 and R11 and the minus terminal of the control section IC are connected. A capacitor C9 is connected between a section between the resistor R7 and the resistor R9 and the other end of the second inductor section L32.

A capacity of the electrolytic capacitor C3 included in the first capacitor 21 is explained.

Figure 2:
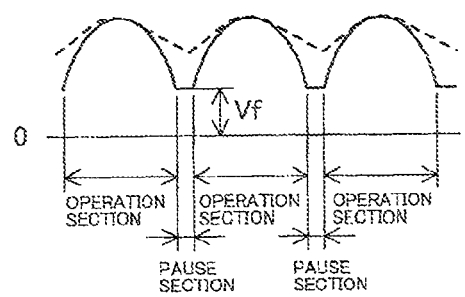
FIG. 2 is a waveform chart of a voltage after smoothing by a first capacitor of the power supply device.
Figure 3:
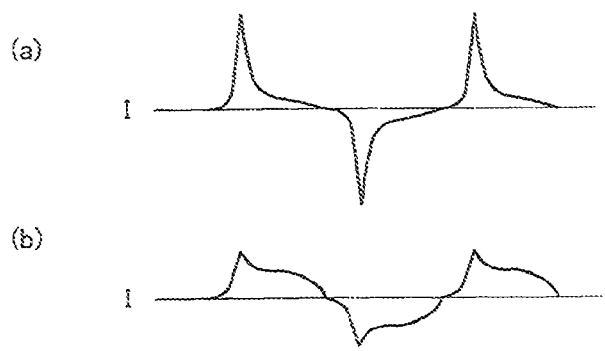
Figure 4:
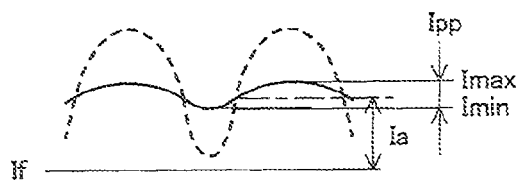
FIG. 4 is a waveform chart of an output current of the power supply device.
Figure 5:
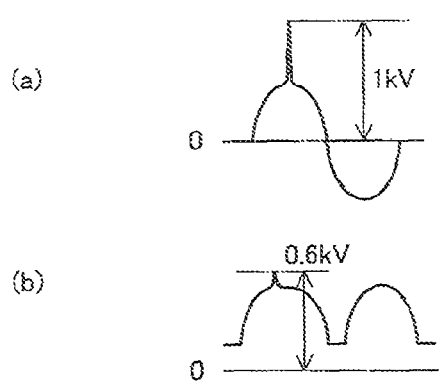

When a voltage after rectification is smoothed, in general, a waveform of a voltage after smoothing is set to a waveform of a voltage after smoothing indicated by a broken line in FIG. 2. The capacity of the electrolytic capacitor. C3 in this embodiment is set small. As indicated by a solid line in FIG. 2, a waveform of a voltage after smoothing is set to a waveform in which a section where the voltage after smoothing drops to the output voltage Vf to the load 11 is provided in a rectified half period of the commercial alternating-current power supply E. In other words, the capacity of the electrolytic capacitor C3 is set to a capacity in which the section where the voltage after smoothing drops to the output voltage Vf to the load 11 is provided in the rectified half period of the commercial alternating-current power supply E.

An electric current flowing in the case of the waveform of the voltage after smoothing indicated by the broken line in FIG. 2 has, as shown in FIG. 3(a), a current waveform of an input type in which the electric current flows only near the peak of the voltage waveform after smoothing. This causes deterioration in the power factor of the power supply device 10.

An electric current flowing in the case of the waveform of the voltage after smoothing indicated by the solid line in FIG. 2 has, as shown in FIG. 3(b), a current waveform closer to a sine wave than the input-type current waveform. This makes it possible to improve the power factor of the power supply device 10.

The capacity of the electrolytic capacitor C5 included in the second capacitor 22 is explained.

The capacity of the electrolytic capacitor C5 is set larger than the capacity of the electrolytic capacitor C3.

Since the capacity of the electrolytic capacitor C3 is small, a ripple included in an output current If tends to be large. As indicated by a broken line in FIG. 4, if the capacity of the electrolytic capacitor C5 is small, the ripple included in the output current If cannot be sufficiently suppressed. Flickering during lighting of the load 11 occurs. On the other hand, as indicated by a solid line in FIG. 4, if the capacity of the electrolytic capacitor C5 in this embodiment is sufficiently large compared with the capacity of the electrolytic capacitor C3, the ripple included in the output current If can be sufficiently suppressed. The flickering during lighting of the load 11 can be prevented.

A parameter indicating a degree of a ripple of an output current can be specified by a ripple factor RF using a current average (an effective current value) Ia and a fluctuation range Ipp of the output current If. The ripple factor RE is obtained by dividing the fluctuation range Ipp of an output current of the power supply device 10 by the lamp current average (effective current value) Ia (RF=Ipp/Ia). The fluctuation range Ipp of the output current If is obtained by subtracting a minimum Imin of the output current If from a maximum Imax of the output current if (Ipp=Imax−Imin). In this embodiment, for example, if the electrolytic capacitor. C3 is set to a capacity in which the voltage after smoothing drops to the output voltage Vf, the capacity of the electrolytic capacitor C5 is set such that a ripple factor of an output current is equal to or smaller than 5, preferably, equal to or smaller than 1.3.

The control section IC controls the field effect transistor Q1 to operate in a section where the voltage after smoothing by the electrolytic capacitor C3 exceeds the output voltage Vf and pause in a section where the voltage after smoothing by the electrolytic capacitor C3 is lower than the output voltage Vf. Specifically, by setting a voltage division ratio between the resistors R4 and R5 and the resistor R6 to a predetermined value, it is possible to cause the field effect transistor Q1 to operate from a section where the voltage after smoothing slightly exceeds the output voltage Vf. Consequently, it is possible to cause the field effect transistor Q1 to stably operate. Therefore, it is possible to supply, to the LED elements 12 of the load 11, the output voltage If equal to or higher than a forward voltage of the LED elements 12 and prevent the occurrence of a period when the LED elements 12 are lit out.

The operation of the power supply device 10 is explained.

The commercial alternating-current power supply E is rectified by the full-wave rectifier DB1 and smoothed by the electrolytic capacitor C3. A rectified and smoothed direct-current voltage is supplied to the falling voltage chopper circuit 16.

In the falling voltage chopper circuit 16, when a predetermined voltage equal to or higher than the output voltage Vf is applied to the gate of the field effect transistor Q1 through the resistors R4 and R5, the field effect transistor Q1 is turned on and an electric current flows to the electrolytic capacitor C5 through the field effect transistor Q1, the resistor R1, and the first inductor section L31 of the inductor L3. When a charging voltage of the electrolytic capacitor C5 rises to be equal to or higher than the forward voltage of the LED elements 12 of the load 11, the electric current flows to the LED elements 12 of the load 11. The LED elements 12 of the load 11 are lit.

When the electric current flows to the first inductor section 31 of the inductor L3, a voltage is induced in the second inductor section L32. The voltage is applied to the gate of the field effect transistor Q1 as a driving signal via the capacitor C6 and the resistor R3. The field effect transistor. Q1 maintains the ON operation.

The control section IC detects, via the resistor R1, a voltage flowing to the field effect transistor Q1, i.e., a voltage after smoothing by the electrolytic capacitor C3 and compares the detected voltage with a reference value. If the detected voltage exceeds the reference value, the control section IC turns on the transistor Q2. When the transistor Q2 is turned on, the voltage applied to the gate of the field effect transistor Q1 drops and the field effect transistor Q1 is turned off.

When the field effect transistor Q1 is turned off, energy stored in the first inductor section L31 of the inductor L3 is discharged through a closed circuit of the electrolytic capacitor C5, the LED elements 12 of the load 11, and the diode D1. The LED elements 12 of the load 11 are lit by an electric current that flows according to the discharge of the energy. A polarity of a voltage generated in the second inductor section L32 of the inductor L3 is inverted. Therefore, the OFF state of the field effect transistor Q1 is maintained.

Thereafter, when the electric current discharged from the first inductor section L31 of the inductor L3 is stopped, the polarity of the voltage generated in the second inductor section L32 of the inductor L3 is inverted again. This time, the voltage acts to turn on the field effect transistor Q1. In this way, the field effect transistor Q1 starts the ON operation again. An electric current flows from the field effect transistor Q1 to the LED elements 12 of the load 11 through the resistor R1 and the first inductor section L31 of the inductor L3.

Thereafter, this operation is repeated. The field effect transistor Q1 performs a high-frequency switching operation and lights the LED elements 12 of the load 11.

The control section IC controls the field effect transistor Q1 to operate in a section where the voltage after smoothing exceeds the output voltage Vf and pause in a section where the voltage after smoothing is the output voltage Vf. Specifically, the control section IC detects, via the resistor R1, the voltage after smoothing by the electrolytic capacitor. C3 flowing to the field effect transistor Q1 and compares the voltage after smoothing with the reference value. The control section IC can determine whether the voltage after smoothing exceeds the reference value and control the field effect transistor Q1 according to a result of the determination.

As explained above, in the power supply device 10 according to this embodiment, the capacity of the electrolytic capacitor C3 is set to a small capacity in which the section where the voltage after smoothing is the output voltage Vf to the load 11 is provided in the rectified half period of the commercial alternating-current power supply E. Therefore, it is possible to change a current waveform after smoothing to a current waveform having a high power factor and improve the power factor.

It is possible to reduce the power supply device 10 in size by using the falling voltage chopper circuit 16. Moreover, in the falling voltage chopper circuit 16, the field effect transistor Q1 is controlled to operate in a section where the voltage after smoothing by the electrolytic capacitor C3 exceeds the output voltage Vf and pause in a section where the voltage after smoothing by the electrolytic capacitor C3 is lower than the output voltage Vf. Therefore, it is possible to supply, to the LED elements 12 of the load 11, the output voltage Vf equal to or higher than the forward voltage of the LED elements 12 and prevent the occurrence of a period when the LED elements 12 are lit out.

As explained above, according to this embodiment, the capacity of the first capacitor 21 is set to the capacity in which the section where the voltage after smoothing drops to the output voltage Vf to the load 11 is provided in the rectified half period of the commercial alternating-current power supply E. The field effect translator Q1 of the falling voltage chopper circuit 16 is controlled to operate in the section where the voltage after smoothing exceeds the output voltage Vf and pause in the section where the voltage after smoothing is lower than the output voltage Vf. Therefore, it is possible to provide the power supply device 10 that is small in size and can obtain a high power factor.

The capacity of the second capacitor 22 is set to a capacity larger than the capacity of the first capacitor 21. The second capacitor 22 is set such that the ripple factor RF is equal to or smaller than 5, preferably, equal to or smaller than 1.3. Therefore, it is possible to suppress flickering.

Further, since the first capacitor 21 is the electrolytic capacitor C3 having a small capacity, it is possible to reduce a surge after smoothing by the electrolytic capacitor C3 to be smaller than a surge before the smoothing. As shown in FIG. 5(a), a surge of, for example, about 1 kV enters the power supply device 10 while being superimposed on the alternating-current voltage of the commercial alternating-current power supply E. However, because the first capacitor 21 is the electrolytic capacitor C3 and the capacitor of the electrolytic capacitor C3 is small, as shown in FIG. 5(b), a surge superimposed on a voltage after smoothing by the electrolytic capacitor C3 can be reduced to, for example, about 0.6 kV. Therefore, although, in general, a surge absorbing element such as a varistor is used between the input section 13 and the rectifying circuit 14, it is possible to omit such a special surge absorbing element, reduce the number of components, and reduce the size of the power supply device 10.

The capacitors 21 and 22 are not limited to the electrolytic capacitors C3 and C5. For example, a film capacitor and the like may be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:
1. A power supply device comprising:
a rectifying circuit configured to rectify an alternating-current power supply;
a first capacitor configured to smooth a voltage after rectification, the first capacitor being set to a capacity such that a voltage after smoothing drops to an output voltage to a load in a rectified half period of the alternating-current power supply and remains dropped to the output voltage until the next half period; and
a falling voltage chopper circuit configured to supply electric power to the load, the falling voltage chopper circuit including at least one switching element configured to receive input of the voltage after smoothing, operate when the voltage after smoothing exceeds the output voltage, and pause when the voltage after smoothing is the output voltage, and a second capacitor provided on an output side and having a capacity larger than the capacity of the first capacitor.
2. The device according to claim 1, wherein the first capacitor is an electrolytic capacitor configured to reduce a surge after the smoothing to be smaller than a surge before the smoothing.

* * * * *